United States Patent
McGrail et al.

(10) Patent No.: US 8,927,662 B2
(45) Date of Patent: Jan. 6, 2015

(54) BINDER OF REACTIVE POLYARYLETHERSULPHONE AND EPOXY RESIN

(75) Inventors: Patrick Terence McGrail, Saltburn-by-the-Sea (GB); Jeffrey Thomas Carter, Middlesbrough (GB); Carmelo LoFaro, San Giovannila Punta (IT)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 10/432,463

(22) PCT Filed: Nov. 6, 2001

(86) PCT No.: PCT/GB01/04914
§ 371 (c)(1), (2), (4) Date: May 21, 2003

(87) PCT Pub. No.: WO02/42376
PCT Pub. Date: May 30, 2002

(65) Prior Publication Data
US 2004/0030061 A1    Feb. 12, 2004

(30) Foreign Application Priority Data
Nov. 21, 2000 (GB) .................................. 0028341.6

(51) Int. Cl.
| | |
|---|---|
| *C08L 63/00* | (2006.01) |
| *C08L 63/02* | (2006.01) |
| *C08L 63/04* | (2006.01) |
| *C08L 81/06* | (2006.01) |
| *C08J 5/24* | (2006.01) |
| C08L 33/04 | (2006.01) |
| C08L 61/02 | (2006.01) |
| C08L 61/10 | (2006.01) |
| C08L 61/24 | (2006.01) |
| C08L 61/28 | (2006.01) |
| C08L 67/06 | (2006.01) |

(52) U.S. Cl.
CPC ... *C08J 5/24* (2013.01); *C08L 81/06* (2013.01)

USPC .......... 525/523; 525/150; 525/153; 525/437; 525/471; 525/505; 525/509

(58) Field of Classification Search
None
See application file for complete search history.

(56) References Cited

U.S. PATENT DOCUMENTS

| | | | | |
|---|---|---|---|---|
| 5,006,611 A | * | 4/1991 | Schmid et al. | 525/423 |
| 5,025,045 A | * | 6/1991 | Gawin et al. | 523/440 |
| 5,231,150 A | * | 7/1993 | McGrail et al. | 525/503 |
| 5,364,914 A | * | 11/1994 | Choate et al. | 525/505 |
| 6,265,491 B1 | * | 7/2001 | Carter et al. | 525/150 |
| 6,437,080 B1 | * | 8/2002 | McGrail et al. | 528/171 |

FOREIGN PATENT DOCUMENTS

| | | | | | |
|---|---|---|---|---|---|
| EP | 311349 A | * | 4/1989 | | C08G 8/28 |
| EP | 365168 A | * | 4/1990 | | C08C 75/23 |
| EP | 412827 A | * | 2/1991 | | C08G 73/06 |
| EP | 420467 A | * | 4/1991 | | C08G 59/02 |
| EP | 486197 A2 | * | 5/1992 | | C08L 79/08 |
| JP | 04328117 A | * | 11/1992 | | C08G 59/40 |
| WO | WO 9943731 A2 | * | 9/1999 | | C08G 65/40 |

* cited by examiner

Primary Examiner — Robert Sellers
(74) Attorney, Agent, or Firm — David P. LeCroy

(57) ABSTRACT

A resin binder composition for the production of a fiber preform comprising an amount of at least one polyarylether thermoplast resin component and an amount of at least one thermoset resin component in weight ratio 80/20-10/90, in substantial absence of a catalyst which is active at the prevailing preform production temperature, wherein the polyarylether thermoplast has number average molecular weight (Mn) in the range 2,000-20,000, and comprises ether linked phenyl units and ether linked arylsulphone units and reactive end groups, method for producing a fiber preform using the thermally stable binder resin composition, a perform obtained with use of the method and composition, a method for injecting or infusing the preform with curable matrix resin, the curable injected or infused preform resin, a method for curing thereof and a cured composite obtained with the method.

4 Claims, 4 Drawing Sheets

BINDER OF REACTIVE POLYARYLETHERSULPHONE AND EPOXY RESIN

The present invention relates to a thermally stable binder resin composition for producing a fibre preform, method for producing a fibre preform using the thermally stable binder resin composition, a preform obtained with use of the method and composition, a method for selecting a binder resin composition, a method for injecting or infusing the preform with curable matrix resin, the curable injected or infused preform, a method for curing thereof and a cured composite obtained with the method.

Composites are used as engineering grade polymers in the construction of load bearing articles, typically in marine, automotive, aerospace and construction industries, such as storage vessels, transportation containers, vehicle parts including cars, trucks, boats, aeroplanes, trains and the like. The composites comprise fibrous reinforcement such as glass fibres, carbon fibres etc, and a cured resin.

Composites are traditionally made from prepregs of fibre impregnated with a matrix resin of combined thermoplast resin and thermosetting resin which are laid up, moulded and laminated. Prepreg properties and quality are controlled for toughness, strength, flexibility and the like. Sheets of prepreg may be cut to size for laying up and moulding in the construction of a given article.

More recently composites are made by various dry moulding processes in which dry fibres are first arranged in a mould as a preform and then injected or infused directly in-situ with matrix resins. The preform fibres are placed in the mould as a fibre form of one or a plurality of plies or layers of fibrous material, laid up with desired fibre orientation to form the required shape and held in place by stitching, weaving, braiding, stapling or bonding using binders.

Thermosetting or thermoplast binder resins are most effective in producing the preform although they have been found to detract from the cured mechanical performance of the composite part obtained therefrom. The binder holds the fibres in position during injection or infusion of matrix resin which may have low viscosity facilitating injection and ensuring penetration and wetting of the fibres of the preform, but typically for example in the case of engineering composites production, has relatively high viscosity requiring pressurised injection which may result in displacement of unstabilised preform. Accordingly a film of more viscous matrix resin is usually laid up against the preform in the mould and heated to infuse into the preform.

There are few commercially available binder systems and these include thermoset epoxy based systems alone or in combination with a polyester thermoplastic resin component. More recently commercially available systems are based on epoxy thermoset and polyethersulphone thermoplast resin component or bismaleimide thermoset and polyetherimide thermoplast resin component. In all cases these systems have simply been formulated to match the matrix resin to be used to avoid incompatability during injection or infusion of the matrix resin.

The commercially available binders are applied by spray technique, as a film or as a powder binder system either applied to fibres or fabric sheets prior to or during the assembly of the fibre form or applied to the fibre form. The binder is essentially the corresponding resin matrix system including a curing agent or catalyst, which has been advanced (i.e. partially cured) in order to render into a solid powder and which can readily impregnate and penetrate the fibres without viscosity constraint. Powders offer certain problems as they tend to fall off the fibre form prior to heating to produce the preform, and they tend to give uneven distribution within the fabric.

We have found that these systems which include an amount of a curing catalyst suffer from a number of problems. The advanced binder resin introduces a number of storage problems whereby the part cured composition is not readily flexible and is subject to developing stresses during storage which can result in explosion of the preform which therefore is ideally only used within a very short period after production. The commercially available systems moreover require heating of the preform to melt the binder resin powder and obtain properties of tack which serve to produce the preform.

Finally few commercially available systems exist which are suited for stabilising preforms in the manufacture of high molecular weight engineering thermoplastic composites. Both producing the preform and injection or infusion thereof with high molecular weight resins is a particular difficulty in view of the thermal instability of the binder resins, and the high melting point and high viscosity of binder resin and matrix resin. This is despite the fact that the dry moulding processes have been developed to overcome viscosity difficulties in manufacture of high molecular weight engineering composites.

In the literature U.S. Pat. No. 4,992,228 and U.S. Pat. No. 5,080,857 disclose alternative systems based respectively on thermoplast resin in the absence of cross linker and on thermoset resin in the absence of catalyst, in each case using heat to tack and produce the fibre preform, to avoid formation of pockets of binder which inhibit matrix resin permeation and lower the finished articles strength, Tg and other properties.

Nevertheless these systems suffer variously from poor flow properties and deformation, poor flow control and resistance to deformation, poor compatibility with matrix resin and the like.

Accordingly there is a need for binder resin systems which allow processing with thermal stability, which may be used with high molecular weight engineering thermoplastic systems and ideally also offer toughening or impact modification of the inter laminar region within the composite structure.

We have now surprisingly found that a particular resin system meets the aforementioned needs in admirable manner and moreover is highly versatile and may be adapted for use with a number of different matrix resin systems and to meet a number of different requirements.

Accordingly in the broadest aspect of the invention there is provided a binder resin composition for the production of a fibre preform comprising an amount of at least one polyarylether thermoplast resin component and an amount of at least one thermoset resin component in weight ratio 80/20-10/90, in substantial absence of a catalyst which is active at the prevailing preform production temperature, wherein the polyarylether thermoplast has number average molecular weight (Mn) in the range 2,000-20,000, and comprises ether linked phenyl units and ether linked arylsulphone units and reactive end groups. The thermoplast is preferably of the class polyethersulphone: polyetherethersulphone (PES:PEES). Advantageously the composition of the invention is characterised by high levels of flexibility and flow control having regard to the Mn thereof.

In a particular advantage the binder resin composition is thermally stable, whereby it lacks any catalyst, curing or cross-linking agent which might be activated at the preform production temperature and moreover is inherently thermally stable at the preform production temperature.

Preferably the binder resin composition is adapted to be held for a period of up 5 to 30 minutes, more preferably of up to 60 minutes at a temperature in the range, 75-125° C., preferably 90-110° C., with no substantial increase in viscosity, preferably with increase in viscosity of less than 10%, preferably less than 5%, more preferably less than 3%.

Preferably the binder resin composition of the invention is a solid preferably a tacky solid at ambient temperature and remains a sticky solid or a resin with low softening point at a preform production temperature in the range 75-125° C., preferably 90-110° C. The binder resin thermoset component may be present as a solid, liquid or melt at the preform production temperature and is preferably capable of dissolving the thermoplast component. In some cases this has an effect whereby the composition undergoes a reduced or substantially no change in viscosity with increase in temperature in this range, i.e. the physical viscosity reduction effect of increase in temperature is in part or substantially counteracted by a viscosity increase effect of solution of the thermoplastic. The composition may undergo decrease in viscosity of less than 30% for example less than 10%. It will be appreciated that components of markedly different viscosity may in combination by liquid or melt solution or otherwise, give a combined viscosity in this range.

Suitably the binder resin composition having viscosity and thermal stability as herein before defined is substantially resistant to diffusion effects and is capable of being transferred onto the surface of fibres to form a preform, without impregnating within the fibres on initial or subsequent heating, or during preparation of a composite structure comprising the preform.

The binder resin composition of the invention is highly specific in terms of both the thermoplast component and the ratio of thermoplast to thermoset components. We have found that the binder resin composition is characterised by properties of tack or conformability which are useful in moulding about and holding in place the fibres in a fibre form for the production of a preform, the composition may be tacky or softens at room temperature or at slightly elevated temperature.

The binder resin composition is moreover flexible whereby it is able to absorb stresses formed in a preform after production, for example during the storage, whereby the preform neither cracks, pulls apart or explodes. Moreover the binder resin composition is resiliently deformable at room temperature, which prevents distortion of preform shape.

Finally the binder resin composition is thermally stable whereby it substantially retains its properties on heating and cooling, for example during the production of a preform, and does not form a barrier to matrix resin flow during subsequent injection by infusion.

The binder resin composition may be provided as a powder, spray or film and is preferably provided as a spray or as a film which may be laid up against a fibre form or interleaved between fibres in fibre form. The film form binder composition provides an additional advantage in that it may be used simultaneously in binding fibres in a preform and in securing the preform in place with respect to a further component to which it is to be moulded or laminated in the subsequent injection or infusion process, such as a further preform, a prepreg, a slab of matrix resin, or a metallic, inorganic or other non-polymeric part.

A film is suitably prepared and/or supported on a release surface and may be of thickness in the range 0.2-10 mm. A film may conveniently be sized and shaped to a desired fabric size and shape. A spray suitably comprises a volatile solvent which is readily removed after transferring binder resin composition to a fibre surface. A spray is suitably adapted for use at ambient or elevated temperature. A film, spray or powder is suitably a tacky solid or capable of softening to a tacky solid whereby it may be transferred to a fabric surface and maintained in position.

Suitably the binder resin composition of the invention comprises a thermoplastic resin and a thermosetting resin in weight ratio 80/20-10/90, preferably in ratio 70/30-20/80, more preferably in ratio 60/40-30/70. It will be appreciated that the ratio of components may be selected according to the nature thereof.

In a particular advantage of the invention we have found that the specific thermoplast in combination with the thermoset operates with synergistic effect having regard to the flow control and flexibility of the combined blend. Suitably the thermoplastic resin component serves to provide flow control for the blend, dominating the typically low viscosity thermoset, and ensuring that the binder merely wets the surface of fibres in the preform and does not penetrate or impregnate fibres. The thermoplast resin component also flexibilises the blend, dominating the typically brittle thermoset. Advantageously the thermoset resin provides tack.

Suitably the at least one polyaromatic comprises ether-linked and/or thioether-linked repeating units, the units being selected from the group consisting of

and optionally additionally

wherein A is $SO_2$ or CO, Ph is phenylene, n=1 to 2, a=1 to 4 and when a exceeds 1, said phenylenes are linked linearly through a single chemical bond or a divalent group other than -A- or are fused together directly or via a cyclic moiety such as a cycloalkyl group, a (hetero) aromatic group, or cyclic ketone, amide, amine, or imine, said at least one polyarylsulphone having reactive pendant and/or end groups.

Preferably the polyarylether comprises ether-linked repeating units, optionally additionally comprising thioether-linked repeating units, the units being selected from

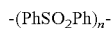

and additionally

wherein Ph is phenylene, n=1 to 2 and can be fractional, a=1 to 3 and can be fractional and when a exceeds 1, said phenylenes are linked linearly through a single chemical bond or a divalent group other than —$SO_2$— or are fused together, provided that the repeating unit -(PhSO$_2$Ph)$_n$- is always present in said at least one polyarylsulphone in such a proportion that on average at least two of said units -(PhSO$_2$Ph)$_n$- are in sequence in each polymer chain present, said at least one polyarylsulphone having reactive pendant and/or end groups.

Preferably in the polyaromatic, which comprises a combination of polyether sulphone and of polyether ether sulphone repeating units, the phenylene group is meta- or para- and is preferably para and wherein the phenylenes are linked linearly through a single chemical bond or a divalent group other than sulphone, or are fused together. By "fractional" reference is made to the average value for a given polymer chain containing units having various values of n or a.

Additionally, as also discussed, in said at least one polyarylsulphone, the relative proportions of the said repeating units is such that on average at least two units (PhSO$_2$Ph)$_n$ are in immediate mutual succession in each polymer chain present and is preferably in the range 1:99 to 99:1, especially 10:90 to 90:10, respectively. Typically the ratio is in the range 75-50 (Ph)$_a$, balance (Ph SO$_2$Ph)$_n$. In preferred polyarylsulphones the units are:

1 X Ph SO$_2$ Ph X Ph SO$_2$ Ph ("PES") and
11 X (Ph)$_a$ X Ph SO$_2$ Ph ("PEES")

where X is O or S and may differ from unit to unit; the mol ratio is I to II (respectively) preferably between 10:90 and 80:20 especially between 10:90 and 55:45; more especially between 25:75 and 50:50; or that ratio is between 20:80 and 70:30, more preferably between 30:70 and 70:30, most preferably between 35:65 and 65:35.

The preferred relative proportions of the repeating units of the polyarylsulphone may be expressed in terms of the weight percent SO$_2$ content, defined as 100 times (weight of SO$_2$)/ (weight of average repeat unit). The preferred SO$_2$ content is at least 22, preferably 23 to 25%. When a=1 this corresponds to PES/PEES ratio of at least 20:80, preferably in the range 35:65 to 65:35.

The above proportions refer only to the units mentioned. In addition to such units the polyarylsulphone may contain up to 50 especially up to 25% molar of other repeating units: the preferred SO$_2$ content ranges (if used) then apply to the whole polymer. Such units may be for example of the formula Ph-A-Ph as hereinbefore defined, in which A is a direct link, oxygen, sulphur, —CO— or a divalent hydrocarbon radical. When the polyarylsulphone is the product of nucleophilic synthesis, its units may have been derived for example from one or more bisphenols and/or corresponding bisthiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl)propane and -methane.

If a bis-thiol is used, it may be formed in situ, that is, a dihalide as described for example below may be reacted with an alkali sulphide or polysulphide or thiosulphate.

Other examples of such additional units are of the formula

-Ph-Q(Ar-Q')$_n$-Phin which Q and Q', which may be the same or different, are CO or SO2; Ar is a divalent aromatic radical; and n is 0, 1, 2, or 3, provided that n is not zero where Q is SO2. Ar is preferably at least one divalent aromatic radical selected from phenylene, biphenylene or terphenylene. Particular units have the formula Ph-Q-[-(-Ph-)$_m$-Q'-]$_n$-Phwhere m is 1, 2 or 3. When the polymer is the product of nucleophilic synthesis, such units may have been derived from one or more dihalides, for example selected from 4,4'-dihalobenzophenone, 4,4' bis(4-chlorophenylsulphonyl)biphenyl, 1,4-bis(4-halobenzoyl)benzene and 4,4'-bis(4-halobenzoyl)biphenyl.

They may of course have been derived partly from the corresponding bisphenols.

The polyaromatic may be the product of nucleophilic synthesis from halophenols and/or halothiophenols. In any nucleophilic synthesis the halogen if chlorine or bromine may be activated by the presence of a copper catalyst.

Such activation is often unnecessary if the halogen is activated by an electron withdrawing group. In any event fluoride is usually more active than chloride. Any nucleophilic synthesis of the polyaromatic is carried out preferably in the presence of one or more alkali metal salts, such as KOH, NaOH or K$_2$CO$_3$ in up to 10% molar excess over the stoichiometric.

As previously mentioned, said at least one polyaromatic contains reactive end groups and/or pendant groups. End groups may be obtained by a reaction of monomers or by subsequent conversion of product polymers prior to or subsequently to isolation. Preferably groups are of formula -A'-Y where A' is a divalent hydrocarbon group, preferably aromatic, and Y is a group reactive with epoxide groups or with curing agent or with like groups on other polymer molecules. Examples of Y are groups providing active hydrogen especially OH, NH$_2$, NHR' or —SH, where R' is a hydrocarbon group containing up to 8 carbon atoms, or providing other cross-linking reactivity especially epoxy, (meth)acrylate, cyanate, isocyanate, acetylene or ethylene, as in vinyl, allyl or maleimide, anhydride, oxazaline and monomers containing unsaturation. Preferred end groups include amine and hydroxyl.

The number average molecular weight of the polyaromatic is suitably in the range 2000 to 20000. A useful sub-range is over 3000, especially in the range of 3000 to 15000, for example 3000 to 13000.

Thermoset resin components may be selected from the group consisting of an epoxy resin, an addition-polymerisation resin, especially a bis-maleimide resin, a formaldehyde condensate resin, especially a formaldehyde-phenol resin, a cyanate resin, an isocyanate resin, a phenolic resin and mixtures of two or more thereof, and is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof, a cyanate ester resin or a phenolic resin. Examples of addition-polymerisation resins are acrylics, vinyls, bis-maleimides, and unsaturated polyesters. Examples of formaldehyde condensate resins are urea, melamine and phenols.

Preferably the thermoset resin component comprises at least one epoxy, cyanate ester or phenolic resin precursor, which is liquid at ambient temperature for example as disclosed in EP-A-0 311 349, EP-A-0 365 168, EPA 91310167.1 or in PCT/GB95/01303. Preferably the thermoset is an epoxy resin.

An epoxy resin may be selected from N,N,N'N'-tetraglycidyl diamino diphenylmethane (eg "MY 9663", "MY 720" or "MY 721" sold by Ciba-Geigy) viscosity 10-20 Pa s at 50° C.; (MY 721 is a lower viscosity version of MY720 and is designed for higher use temperatures); N,N,N',N'-tetraglycidyl-bis(4-aminophenyl)-1,4-diiso-propylbenzene (eg Epon 1071 sold by Shell Chemical Co) viscosity 18-22 Poise at 110° C.; N,N,N',N'-tetraglycidyl-bis(4-amino-3,5-dimethylphenyl)-1,4-diisopropylbenzene, (eg Epon 1072 sold by Shell Chemical Co) viscosity 30-40 Poise at 110° C.; triglycidyl ethers of p-aminophenol (eg "MY 0510" sold by Ciba-Geigy), viscosity 0.55-0.85 Pa s at 25° C.; preferably of viscosity 8-20 Pa at 25° C.; preferably this constitutes at least 25% of the epoxy components used; diglycidyl ethers of bisphenol A based materials such as 2,2-bis(4,4'-dihydroxy phenyl) propane (eg "DE R 661" sold by Dow, or "Epikote 828" sold by Shell), and Novolak resins preferably of viscosity 8-20 Pa s at 25° C.; glycidyl ethers of phenol Novolak resins (eg "DEN 431" or "DEN 438" sold by Dow), varieties in the low viscosity class of which are preferred in making compositions according to the invention; diglycidyl 1,2-phthalate, eg GLY CEL A-100; diglycidyl derivative of dihydroxy diphenyl methane (Bisphenol F) (eg "PY 306" sold by Ciba Geigy) which is in the low viscosity class. Other epoxy resin precursors include cycloaliphatics such as 3',4'-epoxycyclohexyl-3,4-epoxycyclohexane carboxylate (eg "CY 179" sold by Ciba Geigy) and those in the "Bakelite" range of Union Carbide Corporation.

Preferably the epoxy is capable of dissolving the thermoplast component, either by liquid solution, or by melt solution. Suitably choice of epoxy is made with reference to viscosity behaviour, as known in the art.

A cyanate ester resin may be selected from one or more compounds of the general formula NCOAr$(Y_xAr_m)_q$OCN and oligomers and/or polycyanate esters and combinations thereof wherein Ar is a single or fused aromatic or substituted aromatics and combinations thereof and therebetween nucleus linked in the ortho, meta and/or para position and x=0 up to 2 and m and q=0 to 5 independently. The Y is a linking unit selected from the group consisting of oxygen, carbonyl, sulphur, sulphur oxides, chemical bond, aromatic linked in ortho, meta and/or para positions and/or $CR_1R_2$ wherein $R_1$ and $R_2$ are hydrogen, halogenated alkanes, such as the fluorinated alkanes and/or substituted aromatics and/or hydrocarbon units wherein said hydrocarbon units are singularly or multiply linked and consist of up to 20 carbon atoms for each $R_1$ and/or $R_2$ and $P(R_3R_4R'_4R_5)$ wherein $R_3$ is alkyl, aryl, alkoxy or hydroxy, $R'_4$ may be equal to $R_4$ and a singly linked oxygen or chemical bond and $R_5$ is doubly linked oxygen or chemical bond or $Si(R_3R_4R'_4R_6)$ wherein $R_3$ and $R_4$, $R'_4$ are defined as in $P(R_3R_4R'_5)$ above and $R_5$ is defined similar to $R_3$ above. Optionally, the thermoset can consist essentially of cyanate esters of phenol/formaldehyde derived Novolaks or dicyclopentadiene derivatives thereof, an example of which is XU71787 sold by the Dow Chemical Company.

A phenolic resin may be selected from any aldehyde condensate resins derived from aldehydes such as methanal, ethanal, benzaldehyde or furfuraldehyde and phenols such as phenol, cresols, dihydric phenols, chlorphenols and $C_{1-9}$ alkyl phenols, such as phenol, 3- and 4-cresol (1-methyl, 3- and 4-hydroxy benzene), catechol (2-hydroxy phenol), resorcinol (1, 3-dihydroxy benzene) and quinol (1, 4-dihydroxy benzene). Preferably phenolic resins comprise cresol and novolak phenols.

The thermoset resin component is suitably the product of at least partly curing a resin precursor using a curing agent and optionally a catalyst.

In a further aspect of the invention there is provided a method for the preparation of a resin composition as hereinbefore defined comprising admixing the thermoset and thermoplast resin components, optionally in the presence of solvent and/or warming to a temperature of up to 80 C. Suitably the method includes subsequent removal of solvent and/or cooling. In spray form the resin compositions are suitably dissolved in a solvent such as dichloromethane. In film form, the composition is suitably cast onto a solid or fluid phase release surface. In powder form, the composition is suitably granulated and milled to appropriate particle size.

In a further aspect of the invention there is a method for preform production comprising suitably sizing, shaping and/or moulding a fibre reinforcement with use of a mould or tool and contacting with a binder resin composition as hereinbefore defined in effective binding amount. Contacting is suitably by spraying a powder or spray, dusting a powder, or laying up a film binder composition, with subsequent heating to soften in the case of a powder or film.

Preferably the binder resin composition is delivered as a surface coating of 2-15 wt % on the fibre form, more preferably 3-10 wt %, most preferably 5-8 wt % (based on total preform weight).

The preform may be shaped and/or moulded simultaneously or subsequently, with additional heat.

In a preferred embodiment, a preform is produced as the source of support for the resin matrix for Resin Transfer Moulding (RTM). It is preformed in a press to a desired shape and to do so employs the use of a binder resin. This resin is applied to the surface of plies of carbon fibre fabric which are then stacked to a desired configuration. These are placed in the press and heat and pressure are applied in order to shape the preform. The binder which is a sticky solid at room temperature then softens and allows the fabric plies to consolidate into a shape. The press is cooled at which point the binder restiffens and loses it's deformation character. The ejected preform will then hold its desired shape. The preform can then be placed into an RTM press for the injection of matrix resin to complete the composite part.

In a further aspect of the invention there is provided an apparatus for delivery of spray form binder resin composition as hereinbefore defined comprising a rotating and heated surface adapted to receive fabric for spraying and means for locating with respect to a spray means. Suitably spray means comprises air compression means, a reservoir for composition and respective passage means to a spray outlet. A heated drum serves to drive off solvent from the composition, once applied to the fabric.

In a further aspect of the invention there is provided a preform comprising a suitably sized and shaped or moulded fibre form, having a surface coating of binder resin composition as hereinbefore defined in effective binding amount, and tacked, softened or otherwise conformed to the fibre form surface.

Preferably the preform comprises 2-15 wt/o of a surface coating of binder resin composition, more preferably 3-10 wt %, most preferably 5-8 wt %.

The fibre or fabric used in the production of the preform may be any organic or inorganic fibres and mixtures thereof. Organic fibres are selected from tough or stiff polymers such as polyester, polyaromatic or poly paraphenylene terephthalamide. Among inorganic fibres carbon, boron or glass fibres such as "E" or "S" can be used, or alumina, zirconia, silicon carbide, other compound ceramics or metals. A very suitable reinforcing fibre is carbon, for example as graphite. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7.

Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition; examples are the organo-silane coupling agents applied to glass fibre.

In a further aspect of the invention there is provided a method for selecting or blending a resin composition having desired flow control and tack for binding a fibre form as hereinbefore defined, comprising determining a required viscosity for penetration of the given fabric, with reference to density (aerial weight) and/or thickness and selecting a resin composition and/or a dispensing temperature to be used for a selected resin composition, with reference to viscosity-temperature data. Preferably selection includes compatibility matching with a matrix resin to be injected, whereby the binder resin is miscible, soluble and mutually compatible therewith.

In a further aspect of the invention there is provided a method for preparation of a curable composition of matrix resin and preform comprising contacting a preform as hereinbefore defined with matrix resin by injection, infusion, etc.

The binder resin is suited for production of preforms for use with a wide variety of matrix resins comprising in combination or separately a thermoplast and thermosetting resin, typically in weight ratio 10/90-90/10 such as 20/80-40/60, for example 30/70. The binder resin is required to be chemically and physically compatible with the matrix resin to be used. Compatible binder resin may comprise same or different resins and resin component to a suitable matrix resin and will be apparent to those skilled in the art. Importantly the binder resin must not impede or interfere with the injection of matrix resin or alter the flow front in any way. Suitably the binder resin is miscible, soluble and mutually compatible therewith.

Preferred matrix resins comprise a thermoplast and thermoset, selected from components as hereinbefore defined for the binder resin. Preferably binder resin and matrix resin comprise thermoplast component differing only in reactive end group type, Mn and/or PES:PEES ratio, and more preferably differing only in Mn, whereby matrix resin thermoplast has Mn in the range up to 60,000, and PES:PEES ratio. Binder resin and matrix resin may comprise thermoset resin component of different class, whereby binder resin component comprises epoxy resin and matrix resin comprises rein selected from addition-polymerisation resin, a formaldehyde condensate resin, a cyanate resin, an isocyanate resin, a phenolic resin and mixtures of two or more thereof. Preferably binder resin and matrix resin comprise thermoset resin component of same or different resin type within same class, such as the same or different resin types as hereinbefore defined within the class of epoxy resin.

Finally binder resin and matrix resin may comprise the same components in different relative weight ratio of thermoplast to thermoset wherein binder resin has ratio in range 80/20-10/90, preferably in ratio 70/30-20/80, more preferably in ratio 60/40-30/70 and matrix resin has ratio in range 10/90-90/10 such as 20/80-40/60, for example 30/70 as hereinbefore defined.

In a further aspect of the invention there is provided a curable composition comprising a preform bound with a binder resin composition injected or infused with matrix resin obtained with the method as hereinbefore defined.

In a further aspect of the invention there is provided a method for curing a curable composition as hereinbefore defined comprising subjecting to elevated temperature and pressure for a period suitable to effect curing thereof.

In a further aspect of the invention there is provided a preform, curable composition or composite part obtained with use of the methods and composition of the invention, preferably comprising a non-crimped fabric.

The invention is now illustrated in non-limiting manner with reference to the following examples and figures.

COMPARATIVE EXAMPLE

A commercially available binder resin system (Injetex, Ciba-Geigy) comprises a high molecular weight bisphenol-A derived epoxy resin which has the structure wherein Me is —$CH_3$: $H_2COCHCH_2O[PhC(Me)_2PhOCH_2CH(OH)CH_2]_n$ $PhC(Me)_2Ph\ CH_2CHCH_2O$ and a polyester based polymer based on the reaction product of glycol/aromatic diacid and maleic anhydride (MA), having COOH and OH functionalities in its backbone both capable of reacting with the epoxy moiety.

The epoxy was solid at RT and possessed a Tg above RT. These polymers tend to be semi solids or liquids depending upon the amount of MA incorporated into the chain, and had been applied as a spray to the surface of HTA 6K Satin Fabric. Visual examination revealed that the binder appeared as a crude deposit upon the surface present in an amount of 7-8%, and was not homogeneous in its distribution.

The binder composition was examined using rheometrics to see what Theological properties it possessed at a preforming temperature of about 100° C. Rheometrics showed that the moduli and the viscosity drop as expected in step with the temperature rise from 35 to 70° C. After 70° C. the moduli and viscosity level out and remain fairly constant as the temperature approaches 100° C. This levelling out is as a result of the binder not entering into complete liquid flow it remains as a sticky solid. This is an important feature for the binder to possess as the binder should simply soften during preformation without penetrating the fibre bundles, and not impregnate deep into the fibre bundles during preforming. If this occurred then the binder could act as an obstacle to the resin flow front upon injection which could result in void formation.

The binder was also studied isothermally at the preforming temperature of 100° C. to determine its thermal stability properties at this temperature, and viscosity measured as a function of time. The typical times used in preformation can be as long as 60 minutes. The results showed that the binder when held at the preforming temperature is unstable causing the viscosity to increase from 100 Pa·s up to 1000 Pa·s in just 60 minutes.

The viscosity rise is almost certainly due to the reaction of the epoxy with the polyester resin. This would lead to a degree of cross-linking within the binder. The effect of the cross-linking would present some real problems both during and after resin injection into the preform. During injection the cross-linked binder would remain as a solid and as such the resin would see the binder as an obstacle which would effect the flow front properties. This could well result in the presence of voids when the composite part is cured.

The effect these voids would have upon the composite properties would be reflected in solvent uptake and loss of mechanical performance.

Example 1

Preparation of Binder Resin Composition According to the Invention

Thermoplastic polymers were used in conjunction with epoxy resins to formulate binder resins which would be tacky at RT and would remain as sticky solids at the preforming temperature of 100° C.

The presence of the Thermoplastic would ensure that a part of the binder formulation would have a high Tg and as such would provide the room temperature stiffness required by the preform to prevent distortion of the preform shape. The epoxy resin would give the binder formulation the flow properties required to deform at the preforming temperature.

The resin compositions were prepared by warming epoxy or epoxies, at temperature not exceeding 60° C. The polyaromatic comprising 40:60 PES:PEES copolymer with primary amine termination, Mn 12,000, (hereinafter PES:PEES) was synthesised by reacting 1 mol of DCDPS with 2 moles of m-aminophenol using potassium carbonate as the catalyst and sulpholane as the reaction solvent. The polyaromatic, dissolved in a small amount of dichloromethane, was then added in an amount of from 80-50 wt %. Once the resins had been warmed and their viscosity reduced the solvent was removed at 60° C. to leave a solid material. The resin was used immediately or cooled for later use.

The physical appearance of the formulations varied from the 80/20, 70/30 being dry solids to the 60/40 being a sticky solid to the 50/50 being a clear resin with a low softening point.

Epoxies investigated were commercially available MY0510 and PY306

The formulations were examined using rheometrics to observe the Theological properties of each binder formulation.

From the results of the study, a drop in viscosity is observed due to the presence of the epoxy part of the formulation as a result of an increase in processing temperature. At lower amounts of thermoplastic component (50:50 blend) a linear response is observed to the increase in temperature and at about 80-90° C. the binder formulation had become a transparent homogeneous resin.

At increasing levels of thermoplastic component (60/40 blend) the viscosity drop was observed to level out and rise again at 70-75° C. as the thermoplastic became soluble in the epoxy resin. When no further thermoplastic was capable of solubilising, viscosity levelled out again at 80° C. and continued to fall slowly as the temperature was further increased. The physical state of this resin at 100° C. was that of a sticky opaque solid very similar to that of the Comparative Example.

At higher levels of thermoplastic component (70/30 blend) the viscosity profile changed becoming more dominated by the increased amount of thermoplastic. At the end of the test this formulation was also a sticky opaque solid.

Thermal Stability

The viscosity profile of the binder formulations (60/40 blend) were studied as a function of time at 100° C. and compared with the viscosity profile of the comparative example (Injetex system).

Both the binder formulations of the invention containing PES:PEES show no signs of viscosity increase unlike that of the Injetex binder. This demonstrates the thermal stability of the binder resin compositions of the invention.

Effect Upon Matrix Resin Mechanical Properties

The binder applied to the surface of the carbon fibre fabric will eventually find itself as part of the injected resin and in doing so could effect the cure properties and ultimate mechanical/environmental properties of the cured part. Neat resin castings, based on PES:PEES and epoxy, containing 20% thermoplastic, were prepared. To one casting the level of MY0510 was adjusted to give only 10% thermoplastic. To a further casting the level of PY306 was also adjusted to give only 10% thermoplastic.

The following table represents the Fracture Mechanics results of the two systems highlighted above. These are compared to that of a reference matrix resin PES:PEES/80% epoxy.

| Material | Yield Stress (MPa) | Modulus (GPa) | $K_C$ (Mpam$^{-3/2}$) | $G_c$ (kJm$^{-2}$) | Ductility Factor (mm) |
|---|---|---|---|---|---|
| 20% PES:PEES/ 80% epoxy | 170.4 | 3.4 | 0.68 | 0.15 | '0.0269 |
| 10% PES:PEES/ 90% MY0510 | 167.7 | 3.1 | 0.76 | 0.2 | '0.0349 |

-continued

| Material | Yield Stress (MPa) | Modulus (GPa) | $K_C$ (Mpam$^{-3/2}$) | $G_c$ (kJm$^{-2}$) | Ductility Factor (mm) |
|---|---|---|---|---|---|
| 10% PES:PEES/ 90% PY306 | 165.6 | 3.1 | 0.7 | 0.18 | '0.0298 |

As can be seen from the above table the presence of the additional levels of the two epoxies does not effect the mechanical properties of the neat resin castings compared to that of the reference matrix resin.

Example 2

Production of Preforms

Both the MY0510 and PY306 epoxy resins blended with the PES:PEES resin Were utilised as binders for use as processing aids with carbon fibre fabric.

The binders were applied by means of a thin film. The film was manufactured by predissolving the PES:PEES into Dichloromethane (DCM) followed by the epoxy resin. The amount of DCM was adjusted to give a particular solids content. A slightly larger than A4 size sheet of mould release paper was placed onto a flat A3 sized metal sheet.

The binder resin solution was placed at the top of the mould release sheet and a mia bar was used to draw the resin solution the whole length of the sheet. The mould release paper was then allowed to dry at RT in a fume cupboard with a high flow velocity.

The paper was then weighed and the amount of binder present calculated as a percentage the binder was transferred onto HTA 6K Satin Weave carbon fibre fabric by placing the mould release sheet onto an A4 size fabric sheet. An iron was then used to transfer the binder film from the release sheet onto the fabric surface.

The above production method was used with the Compositions of Example 1 and of the Comparative Example Binder impregnated fabrics were manufactured as follows and assessed for formability of the fabric as a preform.

The preform tool consisted of a block of wood. The pre cut fabric was placed over the block until several layers had been built up. This produced a series of fabric sheets each one having a surface containing 5% of a binder formulation based on a 60/40 distribution of PES:PEES/MY0510 or PES:PEES/ PY306 or the Comparative composition.

The fabric layers were then surrounded by a release film and bagging material. A vacuum was applied and the fabric was heated to 100° C. where it was held for 60 minutes. The preforms were then cooled to RT and removed from the tool.

Flexibility

The right angled hinge of the preforms were then assessed for their stiffness and ability to reform the right angle upon straightening to a 1800 angle. All those binder formulations evaluated for preformability were found to be of an acceptable quality compared to that of the Injetex system.

Interlaminar Properties

A PES:PEES modified epoxy matrix impregnated unidirectional prepreg was obtained by impregnating the resin on T800 carbon fibre. Binder films were applied to the surface of the uni-directional tape as described above.

Composite specimens were prepared for testing as Short Beam Shear and Transflexural Strength. The following table details the results.

| Test | PES:PEES epoxy matrix Reference | PES:PEES epoxy matrix + PES:PEES/PY306 | PES:PEES epoxy matrix + PES:PEES/MY0510 |
|---|---|---|---|
| TFS* (N/mm²) | 166.7 | 165 | 144 |
| SBS** (N/mm²) | 103 | 102 | 102 |
| G<sub>1c</sub> Mode I* (in-lb/sq.in) | 1.62 | 1.06 | — |

*16 ply laminate (a crack starter was included)
**24 ply laminate.

The above results appear to show that the inclusion of the binder into the prepreg has not compromised some of the critical toughness properties and has not affected, to any great extent, the interfacial properties of the laminates.

Further work using the PES:PEES system has demonstrated that the presence of the binder is giving a positive contribution to the delamination properties of the composite materials.

Mechanical tests have been carried out on the following composite materials in which cf denotes carbon fibre:

| Prepreg material | Binder present | PES:PEES content in core epoxy (%) | $G_{IC}$ (kj/m²) |
|---|---|---|---|
| cf/epoxy + PES:PEES matrix | No | 0 | 0.57 |
| cf/epoxy + PES:PEES matrix | Yes | 0 | 0.7 |
| cf/epoxy + PES:PEES matrix | No | 10 | 0.63 |
| cf/epoxy + PES:PEES matrix | Yes | 10 | 0.53 |
| cf/epoxy + PES:PEES matrix | no | 15 | 0.6 |
| cf/epoxy + PES:PEES matrix | yes | 15 | 0.81 |

The lay up of the samples tested was [0]5 [+−,90]s weave [0]5, this hybrid geometry allowed the measurement of the fracture toughness of the weave structure while the unidirectional plies were used to stiffen the sample.

The results of the tests show that the initiation toughness, as represented by this particular geometry, are all very similar (likely experimental error for GIC is 0.1 kJ/m²).

R-curves were examined, a rising r-curve for a weave laminate shows that the structure of the weave is being disturbed by the propagation of a crack Laminates containing no binder show a strong tendency to exhibit rising curves; Laminates including binder show flat r-curves.

Interfacial Studies of Binder/Carbon Fibre Surfaces

Samples of the binder resin compositions were used to treat the surface of 6K HTA Satin carbon fibres these were then treated to a thermal cycle. A series of washings were then carried out in order to demonstrate if the polymers were indeed grafted to the fibre surface, by study of DMTA spectra.

The DMTA traces clearly show that there is no evidence that the polymer has grafted onto the fibre surface.

Binder Diffusion

During processing it was of interest to find if a higher concentration of the thermoplast resin component existed in the inter laminar region due to the presence of the binder resin on the fibre surface.

Utilising Raman spectroscopy only Carbon was observed no matter what position the laser was in.

An EDAX analysis identified regions of sulphone, CH and aromatics and also the carbon itself

Example 3

Spray Delivery Production of Preforms

Application of the binder may be carried out as part of a manufacturing process with weaving. To produce such geometries as NCF's (with several layers stitched together) a simplified system for delivery of a spray or powder coating may be carried out just after the weaving of the fabric layer had been completed.

Solutions of the binder in dichloromethane were charged to an air compressed paint gun and spray delivered to the surface of fabric/uni-directional carbon fibre or tape. A drum winder was employed to provide a rotating and heated surface on which the fibre was placed. The spray was then delivered to the surface and the heat from the drum winder was used to drive off the solvent. The fibre product obtained had a uniform distribution of the binder on the fibre surface.

FIGS. 1 and 2 illustrate an example of the air compressed paint gun and the binder spray procedure for delivery to the fibre surface on the drum winder.

One of the advantages of the spray delivery system is that fabric materials can be prepared with and with out the binder. This allows the assembly of preforms which will have different levels of binder present.

In order to establish that the two different binder delivery systems were producing the same final effects in the completed laminates Trans Flexural specimens were prepared from both spray binders and from a film binder to establish if both binders were performing the same.

TFS results from the previous graph clearly demonstrated that both binder systems are producing identical mechanical performance in terms of this particular interface property.

Example 4

Resin Film Infusion

The preform of Example 2 was laid up in a mould, overlaid with a 1.5 mm thickness slab of matrix resin and the mould and contents placed in a vacuum bag as illustrated in FIGS. 3 and 4. Heating was carried out to 125° C. to infuse matrix resin comprising corresponding epoxy/polyaromatic in 60/40 ratio and curing catalysts, by melting with resultant viscosity reduction, to form a composite part. Studies were made of resin film infusion of the preform of the invention and a corresponding conventional preform. The binder resin of the invention was found not to impede matrix resin infusion and the finished part was of superior quality and uniformity to the conventional infused preform.

Figure 1:
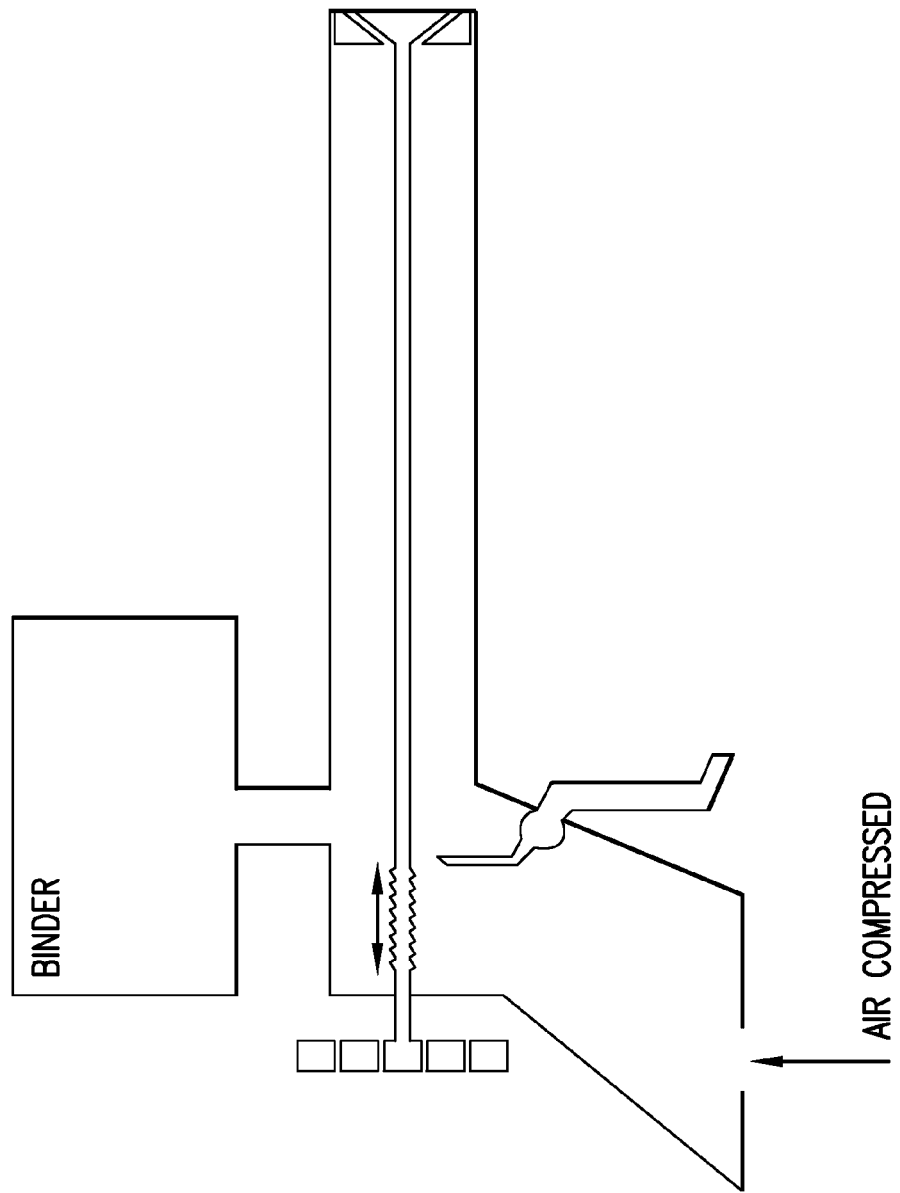
FIGS. 1 and 2 illustrate an apparatus of the air compressed paint gun and the binder spray type for delivery of binder resin composition of the invention to the fibre surface on a drum winder.
Figure 2:
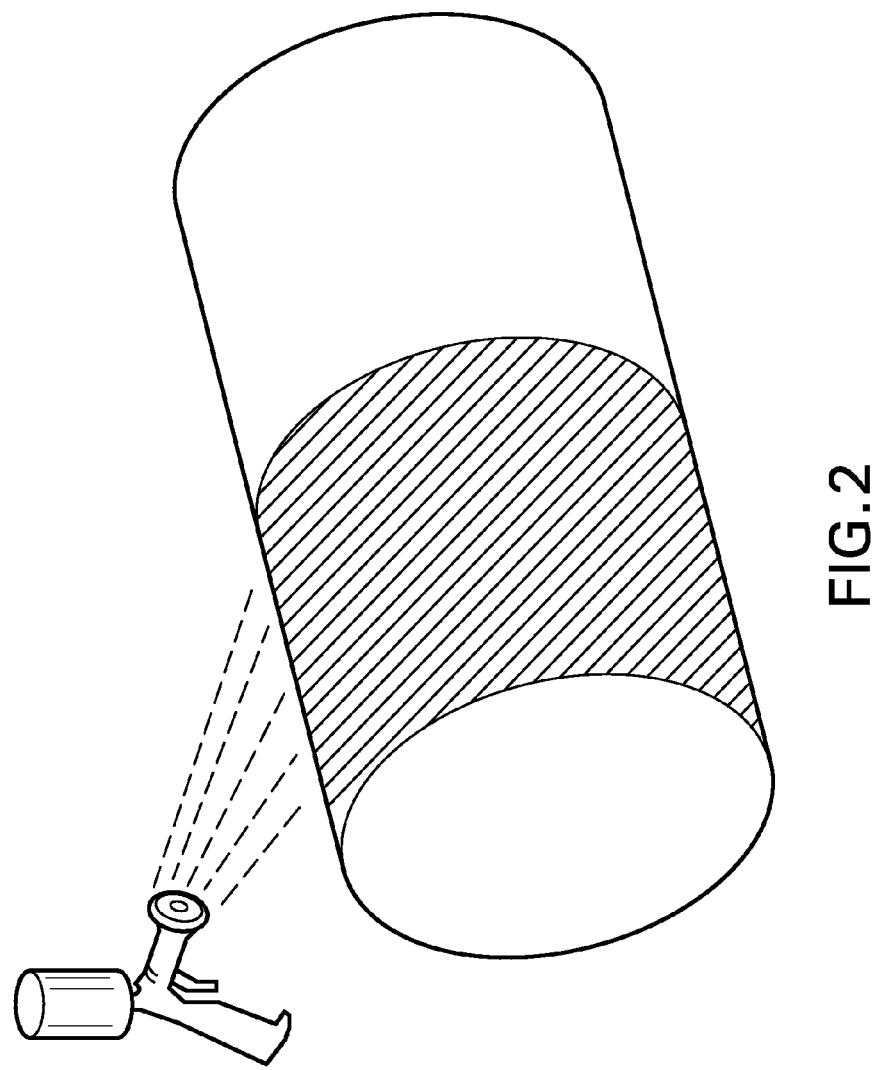
Figure 3:
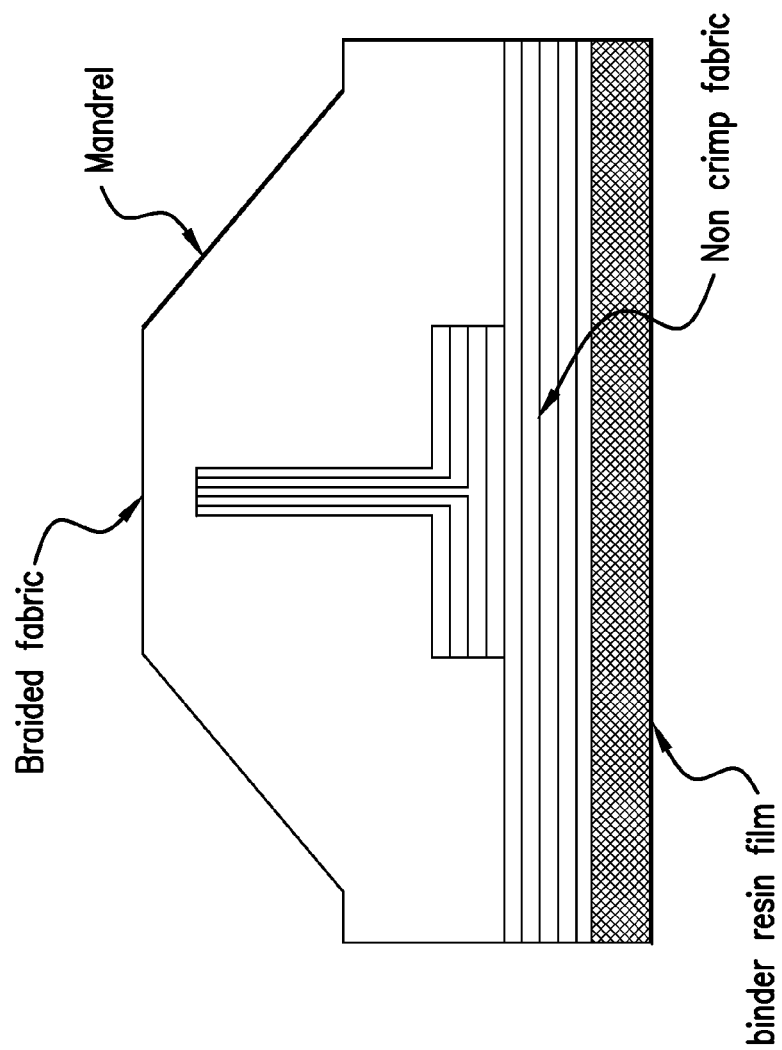
FIGS. 3 and 4 illustrate a vacuum bag for curing a preform of the invention laid up in a mould, overlaid with a slab of matrix resin.
Figure 4:
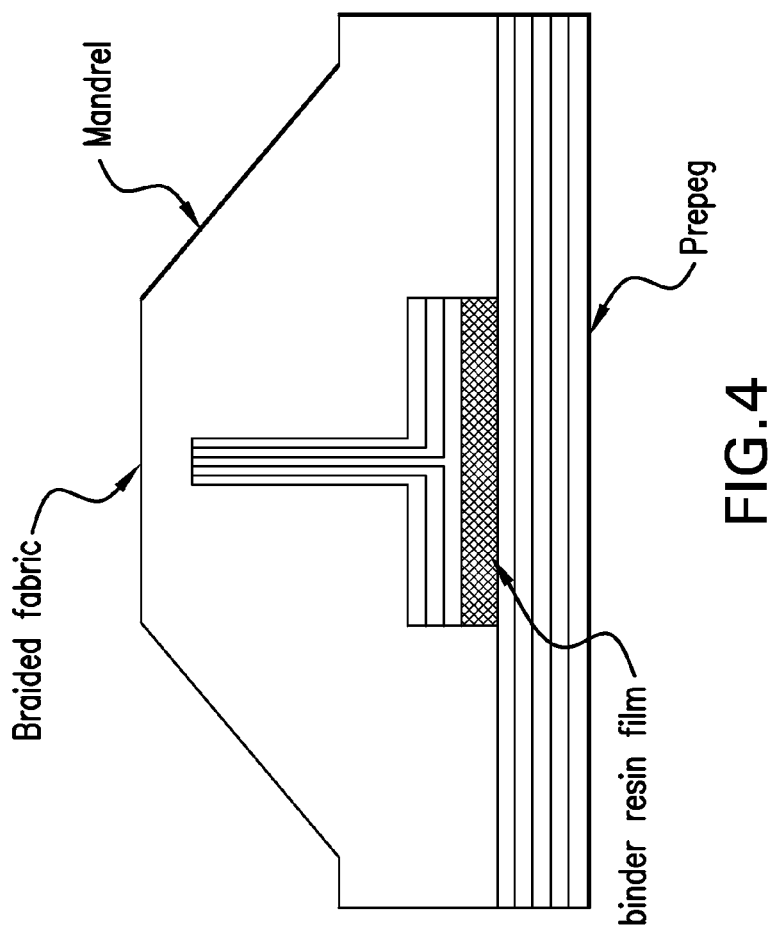

The invention claimed is:

1. A resin binder composition for the production of a fibre preform for resin infusion, in the form of a tacky solid or a resin with softening point at a temperature in the range 75 to 125° C., comprising an amount of at least one polyarylether thermoplast resin component and an amount of at least one epoxy thermoset resin component in weight ratio of thermoplast/thermoset 60/40-30/70 in absence of a catalyst, curing or cross-linking agent which is active at a temperature in the range 75-125° C., such that the composition is thermally stable at a temperature in the range 75-125° C., i.e. is adapted to be held for a period of up to 30 minutes, at a temperature in the range, 75-125° C., with increase in viscosity of less than 10%, wherein the polyarylether thermoplast has number average molecular weight (Mn) in the range 2,000-20,000, and comprises ether linked phenyl units and ether linked arylsulphone units and reactive end groups;

wherein the at least one polyarylether thermoplast resin component comprises ether-linked phenyl units and ether-linked arylsulphone units selected from the group consisting of I X Ph $SO_2$ Ph X Ph $SO_2$ Ph ("PES") and II X $(Ph)_a$ X Ph $SO_2$ Ph ("PEES")

wherein Ph is phenylene, a=1 to 3 and can be fractional and when a exceeds 1, said phenylenes are linked linearly through a single chemical bond or a divalent group other than —$SO_2$— or are fused together, and where X is O or S and may differ from unit to unit: the mol ratio is I to II between 10:90 and 80:20.

2. A resin binder composition for the production of a fibre preform for resin infusion, in the form of a tacky solid or a resin with softening point at a temperature in the range 75 to 125° C., comprising an amount of at least one polyarylether thermoplast resin component and an amount of at least one epoxy thermoset resin component in weight ratio of thermoplast/thermoset 60/40-30/70 in absence of a catalyst, curing or cross-linking agent which is active at a temperature in the range 75-125° C., such that the composition is thermally stable at a temperature in the range 75-125° C., i.e. is adapted to be held for a period of up to 30 minutes, at a temperature in the range, 75-125° C., with increase in viscosity of less than 10%, wherein the polyarylether thermoplast has number average molecular weight (Mn) in the range 2,000-20,000, and comprises ether linked phenyl units and ether linked arylsulphone units and reactive end groups;

wherein the at least one polyarylether thermoplast resin component comprises ether-linked phenyl units and ether-linked arylsulphone units selected from the group consisting of I X Ph $SO_2$ Ph X Ph $SO_2$ Ph ("PES") and II X $(Ph)_a$ X Ph $SO_2$ Ph ("PEES")

wherein Ph is phenylene, a=1 to 3 and can be fractional and when a exceeds 1, said phenylenes are linked linearly through a single chemical bond or a divalent group other than —$SO_2$— or are fused together, and where X is O or S and may differ from unit to unit; the mol ratio is I to II between 10:90 and 80:20;

wherein relative proportions of the repeating units of the polyarylsulphone expressed in terms of the weight percent $SO_2$ content, defined as 100 times (weight of $SO_2$)/(weight of average repeat unit) is at least 22 to 25%; and when a=1 this corresponds to PES/PEES mol ratio of at least 20:80 to 65:35.

3. A resin binder composition for the production of a fibre preform for resin infusion, in the form of a tacky solid or a resin with softening point at a temperature in the range 75 to 125° C., comprising an amount of at least one polyarylether thermoplast resin component and an amount of at least one epoxy thermoset resin component in weight ratio of thermoplast/thermoset 60/40-30/70 in absence of a catalyst, curing or cross-linking agent which is active at a temperature in the range 75-125° C., such that the composition is thermally stable at a temperature in the range 75-125° C., i.e. is adapted to be held for a period of up to 30 minutes, at a temperature in the range, 75-125° C., with increase in viscosity of less than 10%, wherein the polyarylether thermoplast has number average molecular weight (Mn) in the range 2,000-20,000, and comprises ether linked phenyl units and ether linked arylsulphone units and reactive end groups;

wherein the at least one polyarylether thermoplast resin component comprises ether-linked phenyl units and ether-linked arylsulphone units selected from the group consisting of I X Ph $SO_2$ Ph X Ph $SO_2$ Ph ("PES") and II X $(Ph)_a$ X Ph $SO_2$ Ph ("PEES")

wherein Ph is phenylene, a=1 to 3 and can be fractional and when a exceeds 1, said phenylenes are linked linearly through a single chemical bond or a divalent group other than —$SO_2$— or are fused together, and where X is O or S and may differ from unit to unit; the mol ratio is I to II between 10:90 and 80:20 reactive with epoxide groups or with a curing agent or with like groups on other polymer molecules, selected from the group consisting of OH, $NH_2$, NHR' or —SH, where R' is a hydrocarbon group containing up to 8 carbon atoms, or providing other cross-linking reactivity; and wherein relative proportions of the repeating units of the polyarylsulphone expressed in terms of the weight percent $SO_2$ content, defined as 100 times (weight of $SO_2$)/(weight of average repeat unit) is at least 22 to 25%; and when a=1 this corresponds to PES/PEES mol ratio of at least 20:80 to 65:35.

4. A resin binder composition for the production of a fibre preform for resin infusion, in the form of a tacky solid or a resin with softening point at a temperature in the range 75 to 125° C., comprising an amount of at least one polyarylether thermoplast resin component and an amount of at least one epoxy thermoset resin component in weight ratio of thermoplast/thermoset 60/40-30/70 in absence of a catalyst, curing or cross-linking agent which is active at a temperature in the range 75-125° C., such that the composition is thermally stable at a temperature in the range 75-125° C., i.e. is adapted to be held for a period of up to 30 minutes, at a temperature in the range, 75-125° C., with increase in viscosity of less than 10%, wherein the polyarylether thermoplast has number average molecular weight (Mn) in the range 2,000-20,000, and comprises ether linked phenyl units and ether linked arylsulphone units and reactive end groups;

wherein the at least one polyarylether thermoplast resin component comprises ether-linked phenyl units and ether-linked arylsulphone units selected from the group consisting of I X Ph $SO_2$ Ph X Ph $SO_2$ Ph ("PES") and II X $(Ph)_a$ X Ph $SO_2$ Ph ("PEES")

wherein Ph is phenylene, a=1 to 3 and can be fractional and when a exceeds 1, said phenylenes are linked linearly through a single chemical bond or a divalent group other than —$SO_2$— or are fused together, where X is O or S and may differ from unit to unit; the mol ratio is I to II between 10:90 and 80:20;

wherein the polyarylether thermoplast resin component is a combination of polyether sulphone and polyether ether sulphone repeating units, in which the phenylene group is meta- or para- and wherein when a exceeds 1, the phenylenes are linked linearly through a single chemical bond or a divalent group other than sulphone, or are fused together.

* * * * *